(12) United States Patent
Lucas et al.

(10) Patent No.: US 10,222,941 B2
(45) Date of Patent: Mar. 5, 2019

(54) BOTTOM BAR DISPLAY AREA FOR AN AGRICULTURAL SYSTEM

(71) Applicant: CNH Industrial America LLC, New Holland, PA (US)

(72) Inventors: Natalia Lucas, Mundelein, IL (US); Bushra Ali, Bensenville, IL (US); John Stratton, Denver, CO (US)

(73) Assignee: CNH Industrial America LLC, New Holland, PA (US)

( * ) Notice: Subject to any disclaimer, the term of this patent is extended or adjusted under 35 U.S.C. 154(b) by 460 days.

(21) Appl. No.: 14/923,554

(22) Filed: Oct. 27, 2015

(65) Prior Publication Data

US 2017/0115832 A1 Apr. 27, 2017

(51) Int. Cl.
*G06F 3/0482* (2013.01)
*G06F 3/0488* (2013.01)
*G06F 3/0481* (2013.01)
*G06F 3/0484* (2013.01)
*B60K 35/00* (2006.01)
*A01C 21/00* (2006.01)
*A01B 79/00* (2006.01)

(52) U.S. Cl.
CPC ............ *G06F 3/0482* (2013.01); *B60K 35/00* (2013.01); *G06F 3/04817* (2013.01); *G06F 3/04845* (2013.01); *G06F 3/04847* (2013.01); *G06F 3/04883* (2013.01); *G06F 3/04886* (2013.01); *A01B 79/005* (2013.01); *A01C 21/00* (2013.01); *B60K 2350/1004* (2013.01); *B60K 2350/1028* (2013.01)

(58) Field of Classification Search
CPC .................................................. G06F 3/0482

USPC .......................................................... 715/772
See application file for complete search history.

(56) References Cited

U.S. PATENT DOCUMENTS

| | | | |
|---|---|---|---|
| 5,631,825 | A | 5/1997 | van Weele et al. |
| 5,664,128 | A | 9/1997 | Bauer |
| 5,790,120 | A | 8/1998 | Lozares et al. |
| 6,133,898 | A | 10/2000 | Ludolph et al. |
| 6,486,914 | B1 | 11/2002 | Anderson |
| 6,523,045 | B1 | 2/2003 | Beatty |
| 6,621,532 | B1 * | 9/2003 | Mandt .................. G06F 3/0482 348/841 |
| 6,938,051 | B1 * | 8/2005 | Burger ................. G06F 17/217 |
| 7,526,738 | B2 | 4/2009 | Ording et al. |
| 7,688,966 | B2 | 3/2010 | Kumar et al. |

(Continued)

FOREIGN PATENT DOCUMENTS

WO 2007/017642 A1 2/2007

OTHER PUBLICATIONS

"Programming Windows 95 with MFC, Part 5: Menus Toolbars, and Status Bars", Microsoft Systems Journal, Jeff Prosise, Nov. 1995 (36 pages).

*Primary Examiner* — William D Titcomb
(74) *Attorney, Agent, or Firm* — Rickard K. DeMille; Rebecca L. Henkel

(57) ABSTRACT

An agricultural system including a vehicle, a controller; and a display mounted in the vehicle. The display is coupled to the controller and has a display area. The controller is configured to: present a bottom bar along at least a portion of a bottom of the display area; section the bottom bar into a status drawer and a shortcuts drawer; and expand either the status drawer or the shortcuts drawer with an upward motion or a tap on a portion the drawers.

18 Claims, 6 Drawing Sheets

(56) References Cited

U.S. PATENT DOCUMENTS

| | | |
|---|---|---|
| 8,245,155 B2 | 8/2012 | Nakajima et al. |
| 8,302,026 B2 | 10/2012 | Wang et al. |
| 8,370,742 B2 * | 2/2013 | Hieronymus ........ A01D 41/127 |
| | | 715/702 |
| 8,769,436 B2 | 7/2014 | Haire et al. |
| 8,839,146 B2 | 9/2014 | Tseng et al. |
| 8,913,082 B2 | 12/2014 | Takami |
| 9,367,205 B2 * | 6/2016 | Hinckley ............ G06F 3/04817 |
| 9,395,826 B1 * | 7/2016 | Cronin ................ G06F 3/03547 |
| 2003/0098884 A1 | 5/2003 | Christensen |
| 2004/0225954 A1 * | 11/2004 | Maloney ............ G07C 9/00896 |
| | | 715/255 |
| 2007/0135190 A1 * | 6/2007 | Diekhans ............ A01B 69/007 |
| | | 460/1 |
| 2007/0186183 A1 * | 8/2007 | Hudson, Jr. .......... G06F 3/0482 |
| | | 715/810 |
| 2007/0282523 A1 * | 12/2007 | Diekhans ............ A01B 69/007 |
| | | 701/466 |
| 2007/0288860 A1 * | 12/2007 | Ording ................ G06F 3/04842 |
| | | 715/779 |
| 2008/0141166 A1 * | 6/2008 | Goldberg ............ G06F 3/04817 |
| | | 715/788 |
| 2009/0126327 A1 * | 5/2009 | Bussmann ........... A01D 41/127 |
| | | 56/10.2 A |
| 2010/0115452 A1 | 5/2010 | Chabot et al. |
| 2010/0153884 A1 * | 6/2010 | Chow ................ G06F 3/04817 |
| | | 715/841 |
| 2011/0202868 A1 * | 8/2011 | Yang .................... G06F 3/0481 |
| | | 715/781 |
| 2013/0027736 A1 * | 1/2013 | Kittaka ............... G06F 3/04817 |
| | | 358/1.14 |
| 2013/0031208 A1 * | 1/2013 | Linton .................... G09B 7/02 |
| | | 709/217 |
| 2013/0198521 A1 * | 8/2013 | Wu ..................... G06F 21/6209 |
| | | 713/175 |
| 2013/0271448 A1 | 10/2013 | Lazarski et al. |
| 2014/0002351 A1 | 1/2014 | Nakayama |
| 2014/0237378 A1 * | 8/2014 | Gonen ............. H04M 1/72519 |
| | | 715/745 |
| 2014/0237420 A1 | 8/2014 | Song et al. |
| 2014/0298259 A1 * | 10/2014 | Meegan ............ G06F 3/04817 |
| | | 715/810 |
| 2014/0331174 A1 | 11/2014 | Wen et al. |
| 2014/0365971 A1 * | 12/2014 | Laadan .................. H04W 4/18 |
| | | 715/835 |
| 2015/0324068 A1 * | 11/2015 | Bellare ................ G06F 3/0482 |
| | | 715/763 |
| 2016/0267447 A1 * | 9/2016 | Davis ................ G06Q 20/4016 |

* cited by examiner

BOTTOM BAR DISPLAY AREA FOR AN AGRICULTURAL SYSTEM

BACKGROUND OF THE INVENTION

1. Field of the Invention

The present invention relates to an agricultural system, and, more particularly, to a display regime for presenting a bottom bar information and selection area on a display associated with the agricultural system.

2. Description of the Related Art

Modern farming practices have developed to improve the speed and efficiency of the farm equipment used to plant, maintain, and harvest crops. For example, tractors include a global positioning system (GPS) and a controller in the tractor is configured to provide a topographical view of a field and to identify the location of the tractor within the field based on the GPS coordinates. In addition, multiple agricultural implements may be connected to the tractor. During planting, for example, the tractor may pull an air cart having multiple containers including one or more types of seed and/or fertilizer. The tractor may also pull a planter to plant the seeds.

The controller on the tractor may be configured to control operation of the implements connected to the tractor. Different models of each implement may include varying operating parameters such as capacity, rate of application, or number of rows. The operating parameters may also depend, for example, on the configuration or operating characteristics of the tractor or the location within the field. Each of the operating parameters needs to be configured prior to operation of the respective implement. Consequently, each implement typically includes a configuration module stored on the controller of the tractor to configure operation of the respective implement.

However, as the number of features on the agricultural implements increase so does the number of operating parameters and the complexity of configuring operation of the tractor and the connected implements. In addition, different implements such as the air cart and planter may interact with each other. Changing the configuration of a parameter on one of the implements may impact operation of the other implement.

In a known type of planting implement, seed planting or row units are attached to a toolbar extending transverse to the direction of planting. The toolbar is coupled to a tractor or other work vehicle suitable for pulling the planting implement along a field that is to be seeded to a crop. Each planting unit includes a ground penetrating assembly, often including one or more discs, for opening a seed trench or furrow in the ground as the planting implement is pulled across a field. Components of the ground penetrating assembly shape the bottom and sides of the seed trench, and a seed-metering device provides individual seeds at a controlled rate for deposit in the seed trench. Furrow closing components of each row unit close the seed trench in a controlled manner.

Agricultural planters are commonly used implements to plant seeds in soil. An agricultural planter can include a chassis that carries one or more storage tanks carrying seed, and chemical applications that are to be applied to the field during the planting operation, a hitch mechanism that attaches to a tractor or other implement pulled by a tractor, and a tool bar that row units can be connected to so they are carried by the chassis. The planter can also include a pneumatic system carried by the chassis that supplies pressurized air to transport the seeds or other particulate from the storage tanks to the row units.

Each row unit of the agricultural planter places seeds in the field. By having multiple row units working in unison as the planter is pulled across a field, many seeds can be effectively planted in an efficient manner.

The modern farmer faces the challenge of integrating many kinds of equipment starting with the vehicle itself, which can be coupled to all kinds of implements (planters, sprayers, seeders, tillage equipment etc.), and have various navigational controllers and high precision GPS receivers installed. These all lead to very complex setups and a large amount of data.

What is needed in the art is a robust system that allows for the presentation of data and selections in an intuitive and efficient manner on a display.

SUMMARY OF THE INVENTION

The present invention provides a display regime that allows information and selections to be available along a bottom of a screen in an upward expanding manner.

The invention in one form is directed to an agricultural system including a vehicle, a controller; and a display mounted in the vehicle. The display is coupled to the controller and has a display area. The controller is configured to: present a bottom bar along at least a portion of a bottom of the display area; section the bottom bar into a status drawer and a shortcuts drawer; and expand either the status drawer or the shortcuts drawer with an upward motion or a tap on a portion the drawers.

The invention in yet another form is directed to a method of displaying information on a display for an agricultural system that includes a vehicle, and a controller. The display is mounted in the vehicle and is coupled to the controller. The method includes the steps of: presenting a bottom bar along at least a portion of a bottom of a display area of the display; sectioning the bottom bar into a status drawer and a shortcuts drawer; and expanding either the status drawer or the shortcuts drawer with either an upward motion or a tap on a portion the drawers.

An advantage of the present invention is that it information is accessed along a portion of a bottom of the screen with upwardly expanding drawers.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
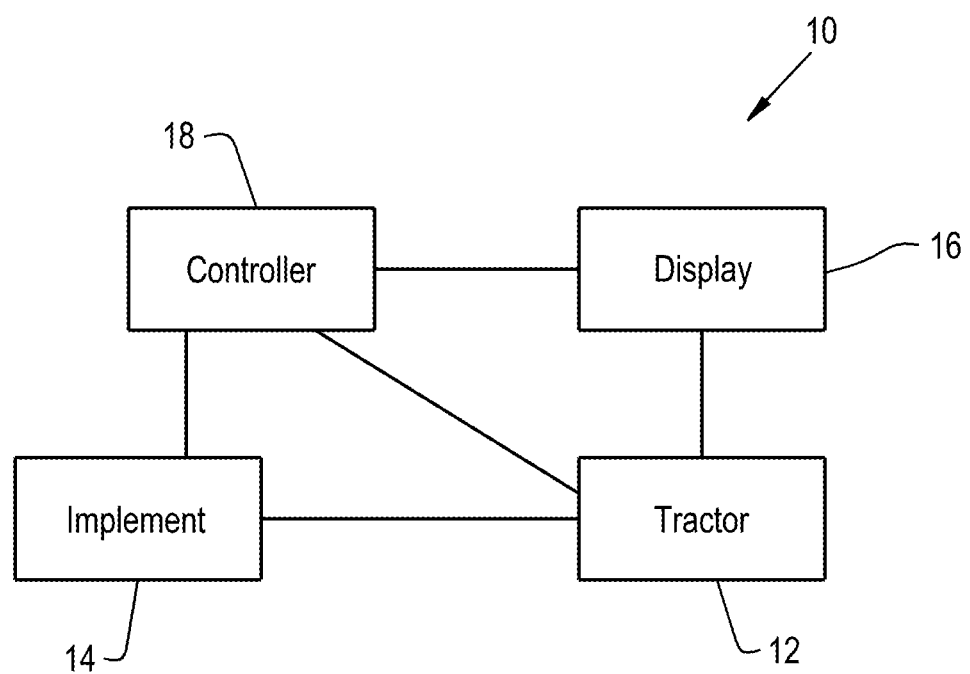
FIG. 1 is a schematic representation of a complete agricultural system using an embodiment of a display method of the present invention for rendering a bottom bar on a display.

Referring now to the drawings, and more particularly to FIG. 1, there is shown an embodiment of an agricultural system 10 having a tractor 12, an implement 14 and a display 16 that is incorporated in tractor 12. Display 16 is an interactive display 16 configured to provide information to a user and allow the user to direct the operation of tractor 12 and/or implement 14. A controller 18 receives information from sensors on implement 14 and tractor 12, processes, stores and displays selected portions of that information and other stored information such as setup information and configuration selections. The displaying of information and control features on display 16 takes into account needed setup and configuration aspects of the agricultural system 10.

Figure 2:
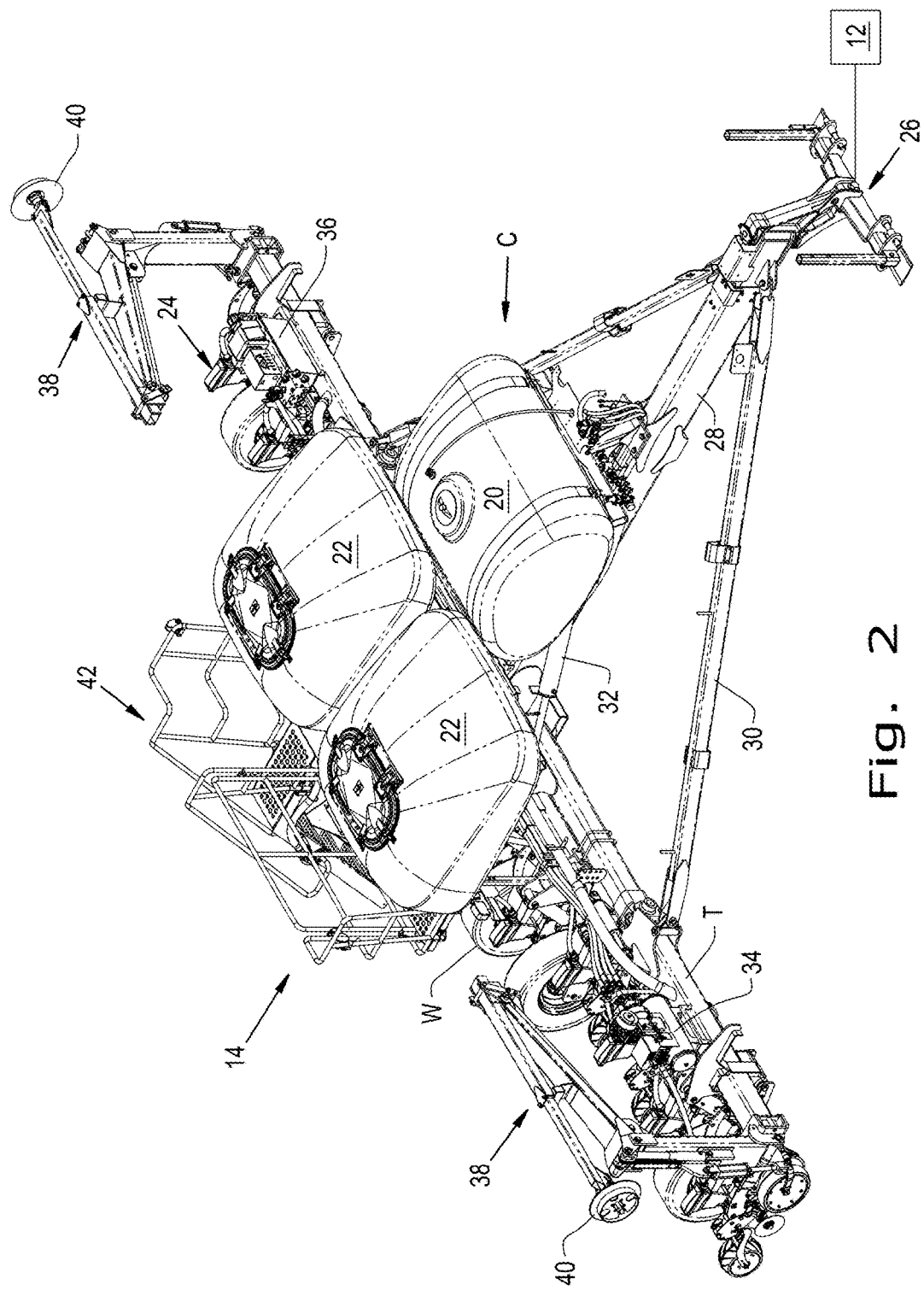
FIG. 2 is a depiction of an implement of FIG. 1 that is coupled to the tractor and provides data for the display in at least the status drawer of the present invention.

Now, additionally referring to FIG. 2, there is shown some details of a typical implement 14 in the form an agricultural planter 14 which generally includes a chassis C forming a support structure for components of the planter 14 that can be formed by a hitch assembly at a front of the planter 14 connected to a tool bar T, main wheels W carried by the chassis near a rear of the planter 14, one or more storage tanks 20 and 22 that can be filled with seed or other agriculture material carried by the chassis, and a plurality of row units 24 connected to the tool bar T and arranged laterally across a length of the tool bar T so that they are carried by the chassis. The chassis C can include a hitch 26 configured to be connected to a tractor 12 or other agricultural implement (not shown) so that the planter 14 can be pulled in a forward direction of travel. The hitch 26 can be integrally formed with or connected to a hitch bar 28 that is connected to the tool bar T by bracing bars 30 and one or more cylinders 32. As can be seen, the planter 14 can also have various hydraulic, pneumatic, and electrical lines (un-numbered) throughout to support various cylinders and systems that are included on the planter 14, such as a pneumatic system 34 connected to the tool bar T and an electric generator 36 also connected to the tool bar T. A marking device 38 can be connected to each lateral end of the tool bar T and extendable so that a marking disc 40 of the marking device 38 can create a line in the soil as the planter 14 is pulled that helps a user in positioning the planter 14 to create subsequent rows. A stair assembly 42 can be mounted to the back of the planter 14 to allow for an operator to access the storage tanks 22.

While a planter 14 is shown in detail it is to be understood that any agricultural implement 14 can be utilized. Further, although a towing of implement 14 by tractor 12 is illustrated herein it should be understood that tractor 12 may be any agricultural, construction, or forestry vehicle that can be coupled to various implements 14.

Figure 3:
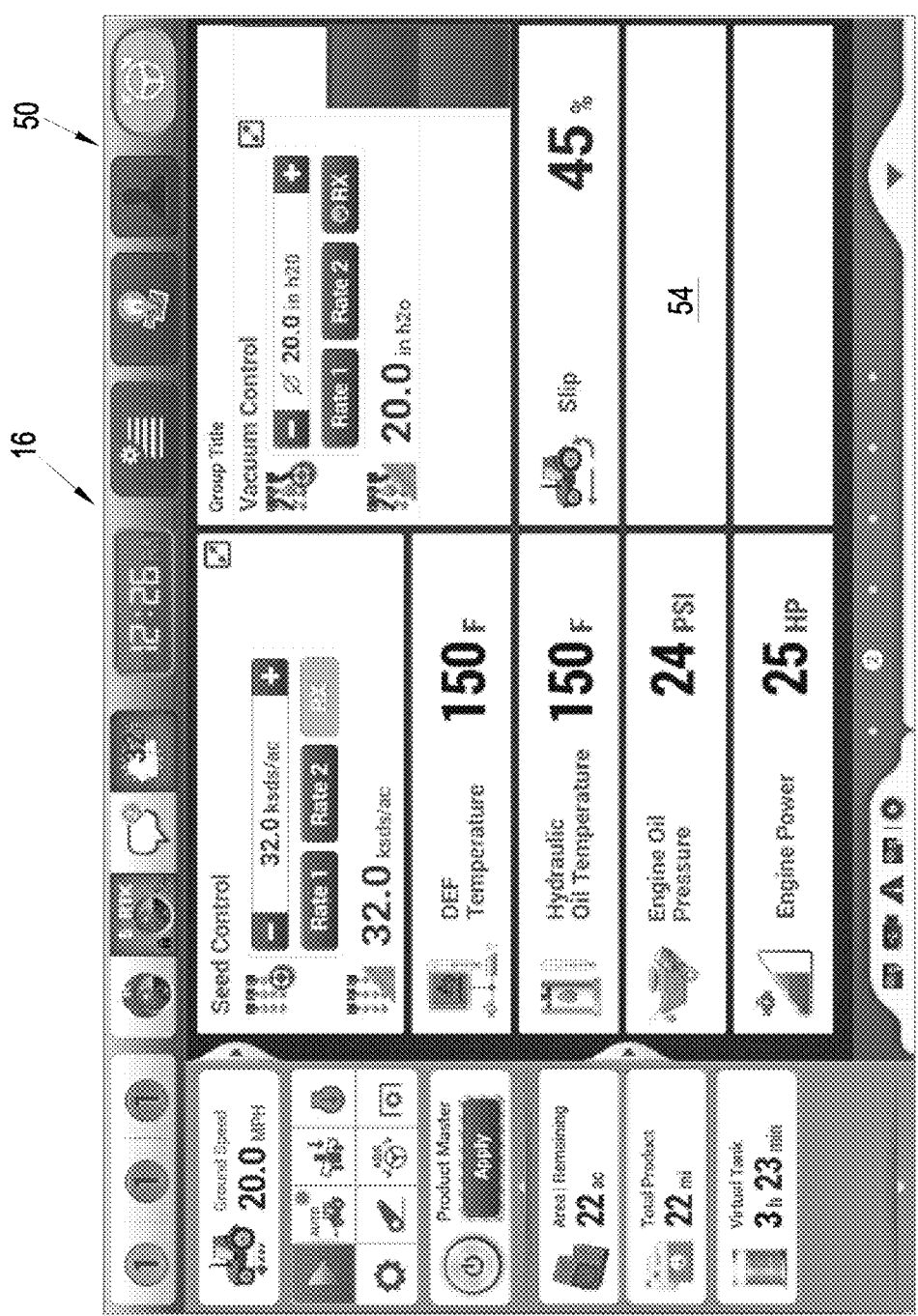
FIG. 3 is a depiction of a display of a runscreen illustrating performance details of the tractor and implement of FIGS. 1 and 2.

Now, additionally referring to FIG. 3, there is shown a screen rendering of operating details selected by the user relative to elements of tractor 12 and for implement 14. For example, the seed control of planter 14 and the vacuum performance of planter 14 is illustrated as well as the DEF temperature of tractor 12. A use of a Phoenix (12 inch) or of a Hawk (8 inch) display 16 is contemplated and a User Experience (UX) framework is designed to consistently display navigational items and provide user customizable areas for equipment controls and feedback.

The Phoenix Display is divided into several distinct screen regions: a Top Bar 50, a Left Hand Area 52, a Runscreen 54, a Bottom Bar 56, and a Menu 58 with a Settings Screen, a Diagnostics Scree, a Productivity Screen, and a Tutorial Mode selection.

The Top Bar 50—Provides access to global level information, tools, and setups. The Top Bar 50 is shown all the time, is never covered by popups, and includes fault lamps, status, Global Navigation Satellite System (GNSS) and Guidance statuses, as well as access to the Menu 58 and the Home Screen.

The Left Hand Area 52 (LHA)—Contains vehicle status and performance data; with views and controls needed as the operator drives and bounces through the field. The LHA 52 is shown all the time to the user, and is never covered by popups. The upper portion is dedicated to vehicle 12. The upper portion can show either regulatory or platform requirements. This portion is not changeable by the user. The lower portion is changeable by the user, with default displays provided. The expandable drawers show additional info when selected by the operator, just one touch away from the runscreen 54.

The Runscreen 54—Contains controls that users need daily in order to efficiently operate the equipment 10 and productively accomplish the job. The Runscreen 54 has views and controls you needed to drive in the field, for example, Target rate control, a planter bar graph, Combine ACS engage, and loss monitors. Layouts of the Runscreen 54 are changeable by the user, with defaults being provided.

The Bottom Bar 56—Contains runscreen 54 page controls, status and shortcuts drawers. These are shown all the time, are never covered by popups; and include fault lamps, status, GNSS and Guidance statuses, access to Menu 58 and Home Screens. The regions help to organize the data and provide the user with a system for understanding where certain types of data, controls, or interactions are available. A particularly distinctive feature is the way the data is organized, with all the setups that are done once in a while being stored under the menu 58 (accessed through Top Bar 50).

Figure 4:
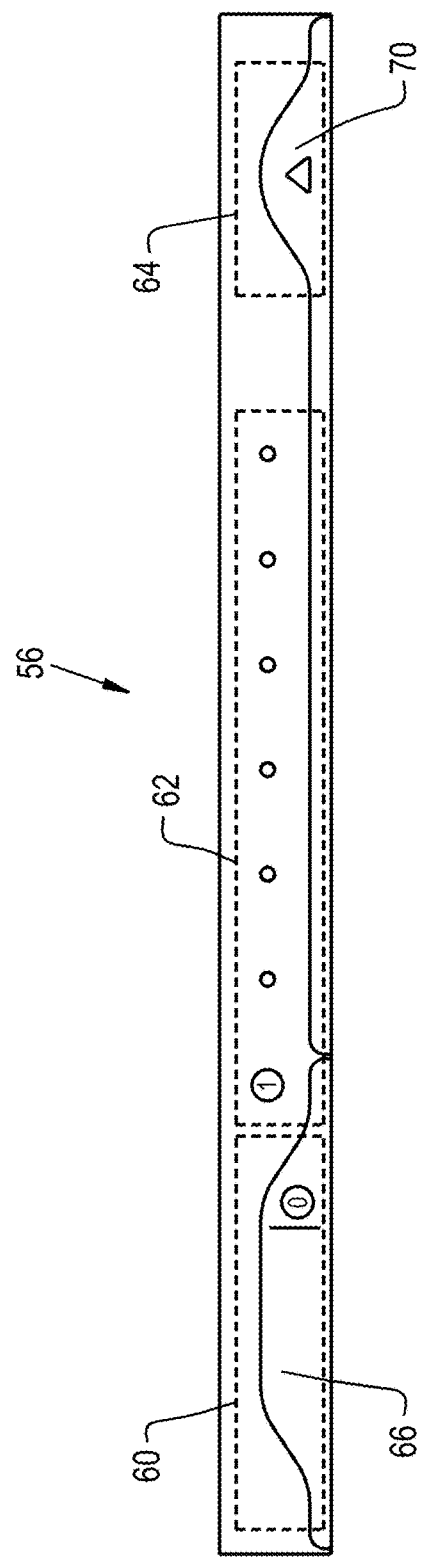
FIG. 4 is a depiction of bottom bar that is displayed along a bottom of the display of FIGS. 1 and 3.
Figure 5:
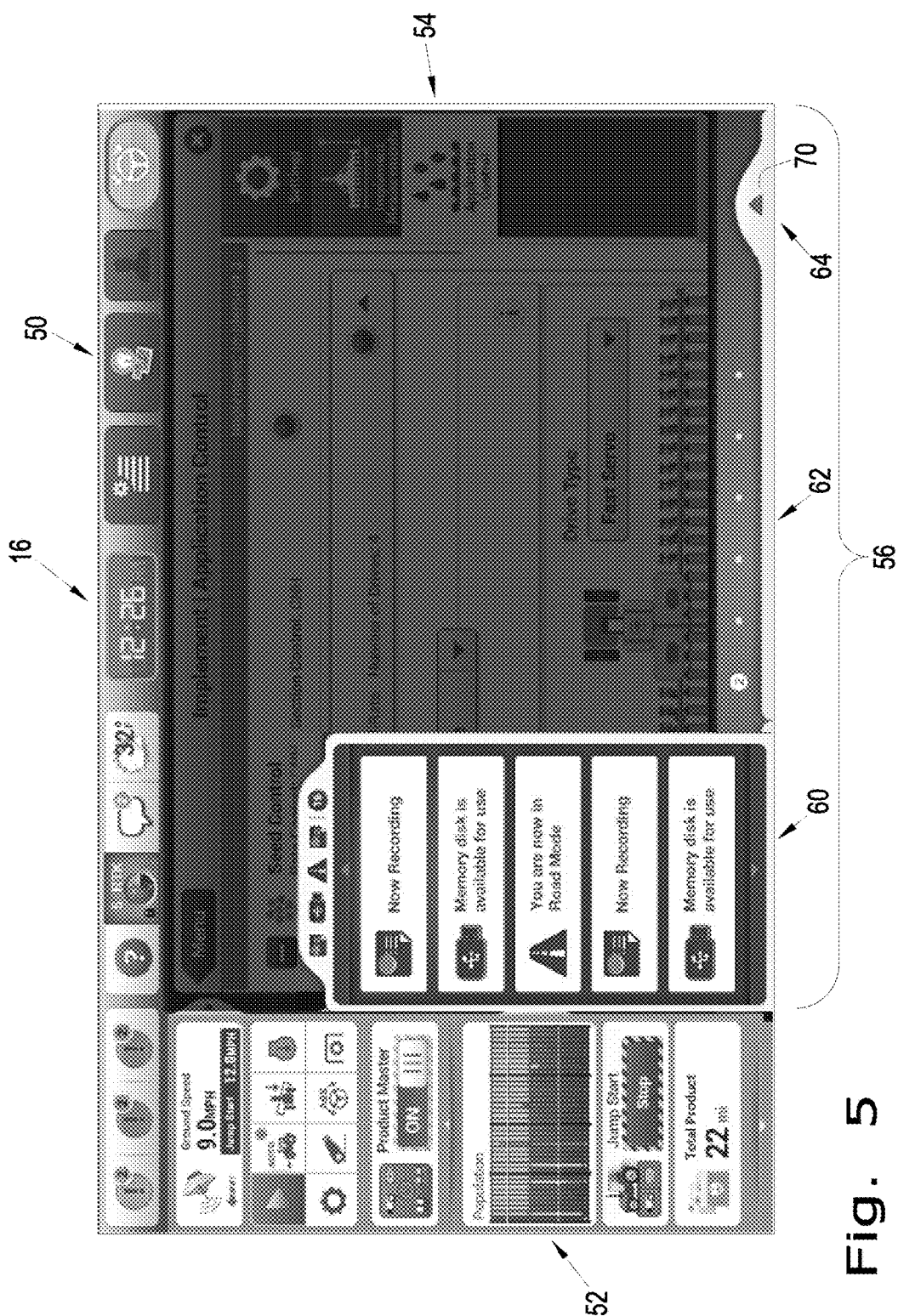
FIG. 5 is a depiction of a screen with status information from systems on the tractor and implement of FIGS. 1 and 2 displayed in the status drawer.
Figure 6:
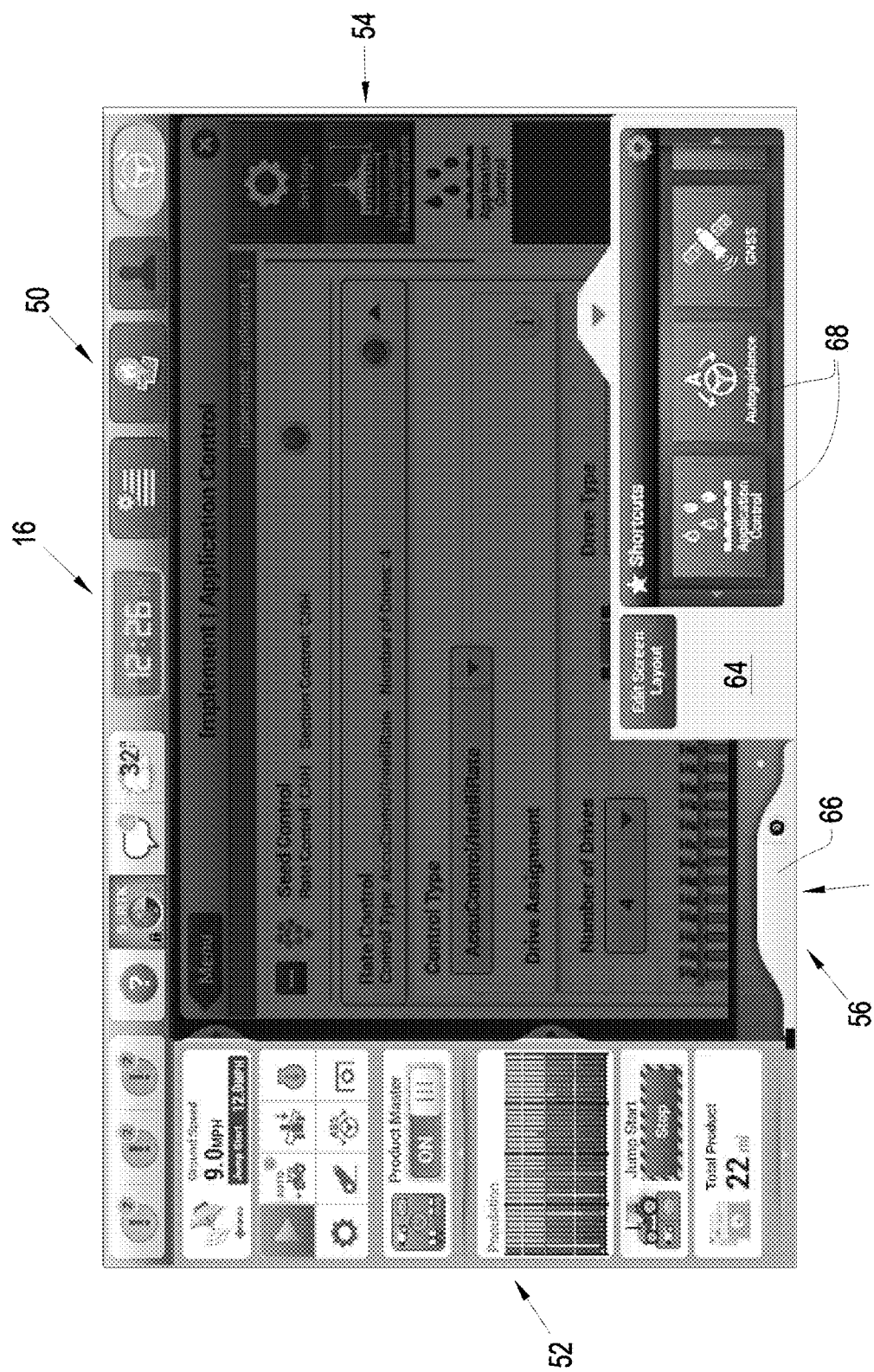
FIG. 6 is a depiction of a screen showing the shortcuts drawer open displaying shortcut buttons.

Now, additionally referring to FIGS. 4-6, there are shown some additional features of Bottom Bar 56. Bottom Bar 56 is a dedicated area of a Phoenix User Interface (UI) which always stays at the bottom of screen and is not covered by pop-ups or other type of UI overlays. LHA 52 drawers can open on top of the bottom bar 56 for a predetermined time. Bottom Bar 56 is organized into three sections, a status drawer 60, runscreen controls 62 and shortcuts 64.

Status drawer 60 displays current, read-only statuses, such as for example, system status, vehicle status, equipment status and/or task in progress status. The runscreen page control 62 is a visual indicator about the number of pages that are being used and which page is selected and currently displayed. The Shortcuts drawer 64 contains the quick access shortcuts that allow the user to quickly access selected setups.

The status drawer 60 displays current, read-only statuses (e.g. system, vehicle, equipment, task in progress, etc.). The drawer handle 66 shows the newest incoming statuses, which may be the latest three, and an additional number indicator that shows the number of current status notifications. The open drawer (illustrated in FIG. 5) displays all the statuses and their short description and it is scrollable if needed. To open the drawer 60, users must tap on handle 66 or slide their finger from bottom to top, pulling drawer 60 open. The drawer 60 slides up on top of Runscreen 54, which is dimmed (as illustrated in FIG. 5) while the data is still updating live, in the background. To close status drawer 60, users can touch anywhere outside of the panel, tap on the handle 66 or slide the handle 66 downwardly from the top. The drawer will show five statuses at a time. With the scroll a maximum of 99 are available. If no current statuses are available, one cell will read "No new statuses." If a user has scrolled in the status drawer, then closes and reopens the drawer, the drawer shall retain the position of the scroll as long as no new items have been added to the drawer. If new items have been added, the scroll resets.

Shortcuts drawer 64 contains the quick access shortcuts that the user added by starring, or selecting, certain setups, or productivity or diagnostics detail pages from under the Menu. Pressing a shortcut button 68 will take the user to the appropriate Menu screen. If the user did not add any shortcuts yet, an instructional message of how to add a shortcut is displayed. Shortcuts can be edited by pressing the icon in the upper-right corner of the drawer 64 (i.e. delete and rearrange by drag and drop). In addition, this drawer 64 contains the Edit Screen Layout button, which will take the user into the Edit Screen Mode. When in Edit Screen Mode, the bottom drawer is replaced with Edit Mode Controls (i.e. add, delete, restore defaults etc.). To open the drawer 64, users must tap on the handle 70 or slide their finger from bottom to top. The drawer 64 slides up to open on top of Runscreen 54, which is dimmed with the data still updating live, in the background. To close drawer 64, users can touch anywhere outside of the panel, tap on the handle 70 or slide the handle 70 from top to down.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural system, comprising:
    a vehicle;
    a controller; and
    a display mounted in said vehicle, said display being coupled to said controller and configured with a display area, said controller being configured to:
        present a bottom bar along at least a portion of a bottom of said display area, the bottom bar stays at the bottom of the display area and is not covered by any pop-up or user interface;
        section said bottom bar into a status drawer and a shortcuts drawer;
        expand one of said status drawer and said shortcuts drawer with one of an upward motion and a tap on a portion said drawers; and
        section said bottom bar additionally into a runscreen page control, the runscreen page control being a section within said bottom bar, the runscreen page control including an indication of at least a number of pages being used in the display area.

2. The agricultural system of claim 1, wherein said controller is further configured to dim a runscreen that is displayed in the display area when one of said status drawer and said shortcuts drawer are expanded.

3. The agricultural system of claim 1, wherein said controller is further configured to display a representation on a handle of said status drawer of at least one recent status update.

4. The agricultural system of claim 3, wherein said controller is further configured to also display a number on said handle of said status drawer, said number representing the number of status updates available in said status drawer.

5. The agricultural system of claim 4, wherein said controller is further configured to display status information descriptions when said status drawer is expanded.

6. The agricultural system of claim 1, wherein said controller is further configured to display at least one shortcut button in said shortcuts drawer when said shortcuts drawer is expanded.

7. The agricultural system of claim 1, wherein said controller is further configured to display numbered tabs in said runscreen page control to indicate a number of runscreens available, with one of the numbers being highlighted to indicate the page currently displayed in the runscreen.

8. The agricultural system of claim 1, wherein said controller is further configured to at least partially cover said runscreen page control with said shortcuts drawer when said shortcuts drawer is expanded.

9. The agricultural system of claim 1, wherein said controller is further configured to return said status drawer or said shortcuts drawer to said bottom bar with one of a tap outside of said drawer, a tap on a handle of said drawer and a downward swipe of said drawer.

10. A method of displaying information on a display for an agricultural system that includes a vehicle, and a controller, the display being mounted in the vehicle, the display is coupled to the controller, the method comprising the steps of:
    presenting a bottom bar along at least a portion of a bottom of a display area of the display, the bottom bar stays at the bottom of the display area and is not covered by any pop-up or user interface;
    sectioning said bottom bar into a status drawer and a shortcuts drawer;
    expanding one of said status drawer and said shortcuts drawer with one of an upward motion and a tap on a portion said drawers; and
    sectioning said bottom bar additionally into a runscreen page control, the runscreen page control being a section within said bottom bar, the runscreen page control including an indication of at least a number of pages being used in the display area.

11. The method of claim 10, further comprising the step of dimming a runscreen that is displayed in the display area when one of said status drawer and said shortcuts drawer are expanded.

12. The method of claim 10, further comprising the step of displaying a representation on a handle of said status drawer of at least one recent status update.

13. The method of claim 12, further comprising the step of displaying a number on said handle of said status drawer, said number representing the number of status updates available in said status drawer.

14. The method of claim 13, further comprising the step of displaying status information descriptions when said status drawer is expanded.

15. The method of claim 10, further comprising the step of displaying at least one shortcut button in said shortcuts drawer when said shortcuts drawer is expanded.

16. The method of claim 10, further comprising the step of displaying numbered tabs in said runscreen page control to indicate a number of runscreens available, with one of the numbers being highlighted to indicate the page currently displayed in the runscreen.

17. The method of claim 10, further comprising the step of at least partially covering said runscreen page control with said shortcuts drawer when said shortcuts drawer is expanded.

18. The method of claim 10, further comprising the step of returning said status drawer or said shortcuts drawer to said bottom bar with one of a tap outside of said drawer, a tap on a handle of said drawer and a downward swipe of said drawer.

* * * * *